July 14, 1959

W. H. McCORKLE 2,894,647

POSITIONING DEVICE

Filed Jan. 26, 1950

INVENTOR.
Willard H. McCorkle
BY
Roland A. Anderson
Attorney.

July 14, 1959  W. H. McCORKLE  2,894,647
POSITIONING DEVICE

Filed Jan. 26, 1950  4 Sheets-Sheet 3

INVENTOR.
Willard H. McCorkle
BY
Roland A. Anderson
Attorney.

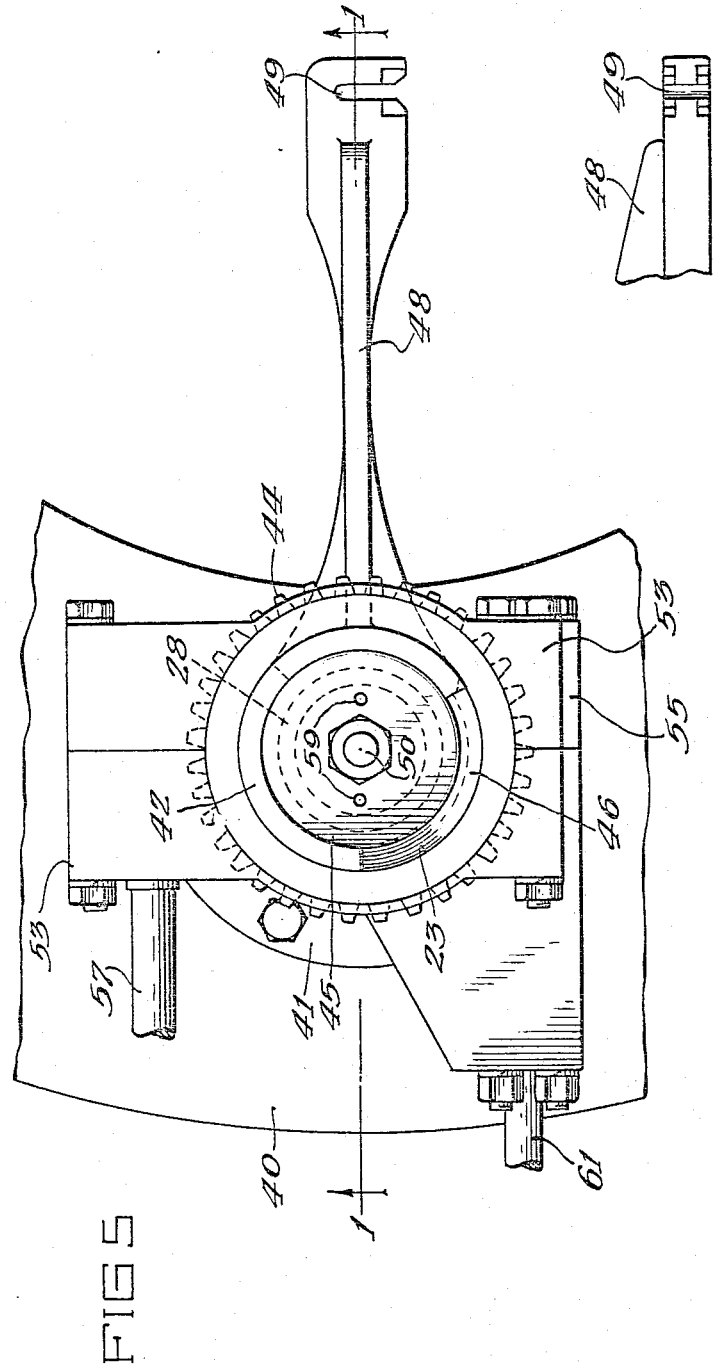

United States Patent Office 2,894,647
Patented July 14, 1959

2,894,647

POSITIONING DEVICE

Willard H. McCorkle, Chicago, Ill., assignor to the United States of America as represented by the United States Atomic Energy Commission Application January 26, 1950, Serial No. 140,604

13 Claims. (Cl. 214—1)

This invention relates to a positioning device whereby a load such as a control rod of a neutronic reactor may be translated and rotated. The invention also provides an auxiliary mechanism by which such a device can be made to translate the load.

It is not possible for personnel to manually adjust the control rods in a nuclear reactor due to bodily danger from reactor radiation. Hence, it is necessary to provide a device to control the reactor capable of being operated by remote means. The control itself is accomplished by positioning control rods within the reactor. This invention is concerned with a positioning device for one of these rods adapted for remote control operation.

It is therefore the principal object of this invention to provide a device adapted for remote operation to translate the position of a reactor rod, or other load.

It is also an object of this invention to provide an auxiliary means whereby the reactor rod, or other load, may be translated rapidly in the event of an emergency, and still permit precise adjustments in the normal course of operation.

Further objects and advantages of the invention will become apparent from the following description and the drawings, in which:

Fig. 5 is an enlarged plan view of the positioning device of Fig. 1; and

Fig. 6 is a fragmentary side elevational view of the arm of the positioning device.

The positioning device consists of a positioning mechanism and an auxiliary mechanism to activate it. The positioning mechanism is designed to permit precise translational positioning of the control rod. It also cooperates in disengaging the control rod from the positioning device by rotating the positioning mechanism away from the control rod after the rod is held fixedly in position by other devices which constitute no part of this invention. The auxiliary activating mechanism is connected to the positioning mechanism to permit the control rod to be withdrawn from the reactor more rapidly than is possible with the positioning mechanism. This is necessary in emergencies in order to prevent uncontrolled reaction in the reactor.

Figure 3:
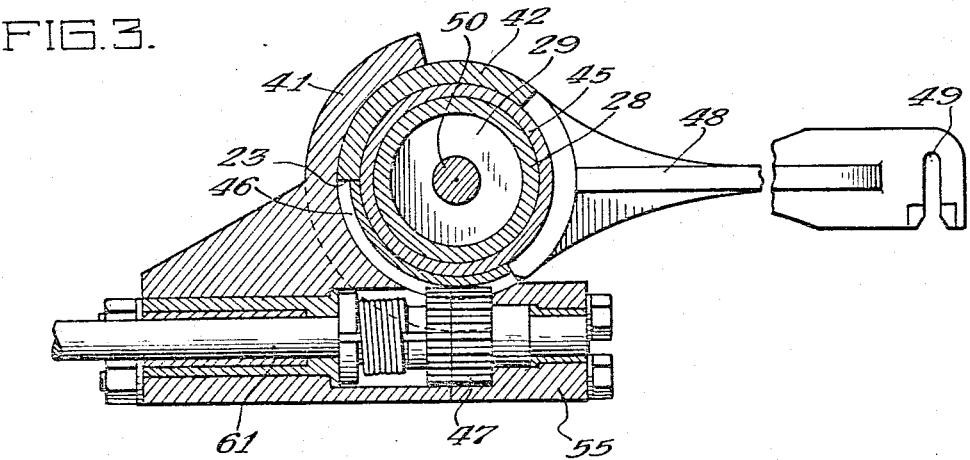
Fig. 3 is a horizontal sectional view of the positioning device taken along line 3—3 of Fig. 2.
Figure 4:
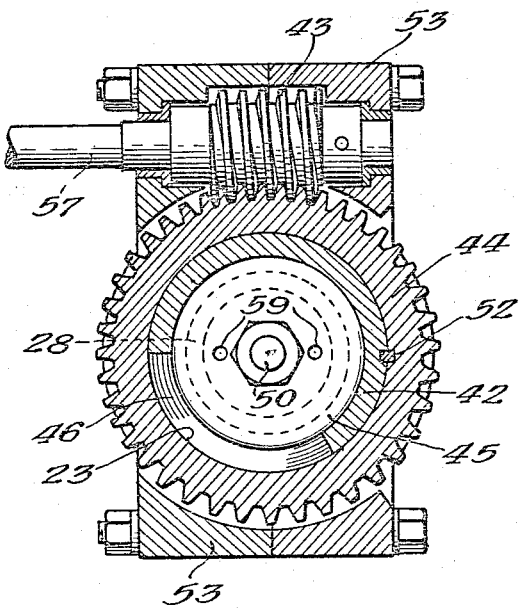
Fig. 4 is a horizontal sectional view of the positioning device taken along line 4—4 of Fig. 2.

In the embodiment of the positioning device disclosed in the figures, a base 40 and a curved support member 41 attached to the base 40 support the other elements of the combination. An element in the form of a cylindrical sleeve 42 which is small enough to slide within the inner surface of the support member 41 provides the rotation for the load. The sleeve 42 rotates upon the base 40 and within the support member 41. The sleeve 42 is rotated by a worm gear 43 meshed with a worm wheel 44 which is attached to the surface of the sleeve 42 by a pin 52, as shown in Fig. 4. The worm gear 43 is journaled in a housing 53. A shaft 57 is connected to the worm gear 43 to provide remote rotation of the sleeve 42. Another element in the form of a cylindrical tube 45 is slideably mounted within the sleeve 42, and provides the translation for the load. The tube 45 is restricted to translational motion along its axis by a rack 46 which is in the form of an arc with the same radius as the sleeve 42, and which is attached to the outer surface of the tube 45 and keyed to a slot 23 in the wall of the sleeve 42, as indicated in Figs. 3 and 4. The rack 46 thus permits translation of the tube 45 along its axis, but does not permit rotation of the tube 45 with respect to the sleeve 42. The slot 23 extends the entire length of the sleeve 42, and the rack 46 extends the entire length of the tube 45. Translational motion is imparted to the tube 45 by the meshing of the rack 46 with a pinion gear 47 mounted in a housing 55 on the support member 41, as indicated in Fig. 3. The pinion gear 47 is connected to a shaft 61, which will permit remote adjustment of the tube 45. The control rod or other load is coupled to the tube 45 by an arm 48 which is attached to the lower end of the tube 45, and which has a receptacle 49 near its end in the form of a recess. This receptacle 49 is adapted to fit into a cooperating plug on the load, not shown. The arm 48 extends from the tube 45 through the sleeve 42 and the support member 41. Part of a section of the sleeve 42 and the support member 41 is cut away to permit the desired motion of the arm 48. Hence, as Figure 3 indicates, the rack 46 is keyed between the arm 48 and the sleeve 42 below the point where the sleeve 42 is cut away to permit rotation and translation of the arm 48. But above that point, the rack 46 is keyed in the slot 23 in the wall of the sleeve 42.

Figure 1:
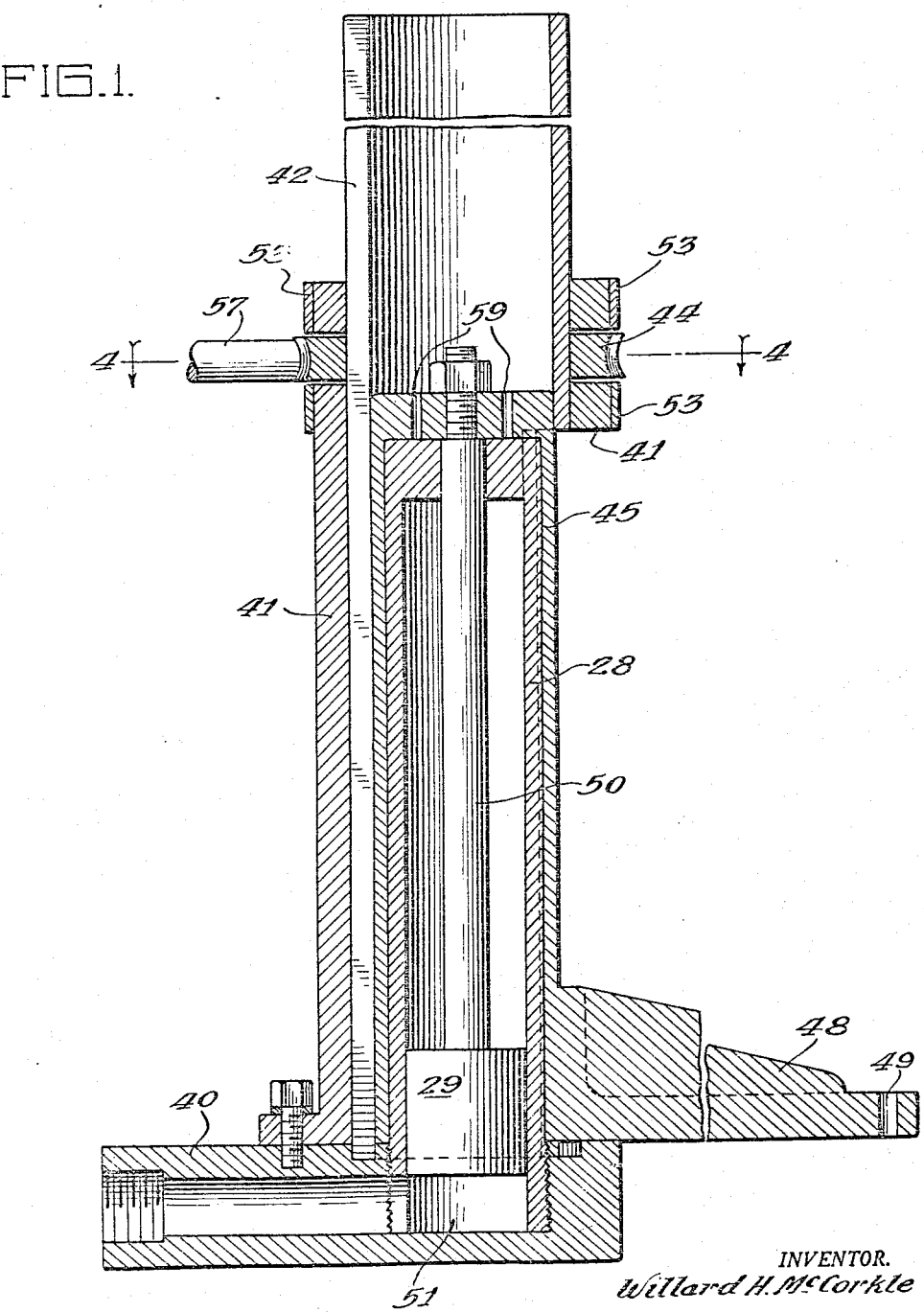
Fig. 1 is a vertical sectional view of a positioning device including an auxiliary activating mechanism.
Figure 2:
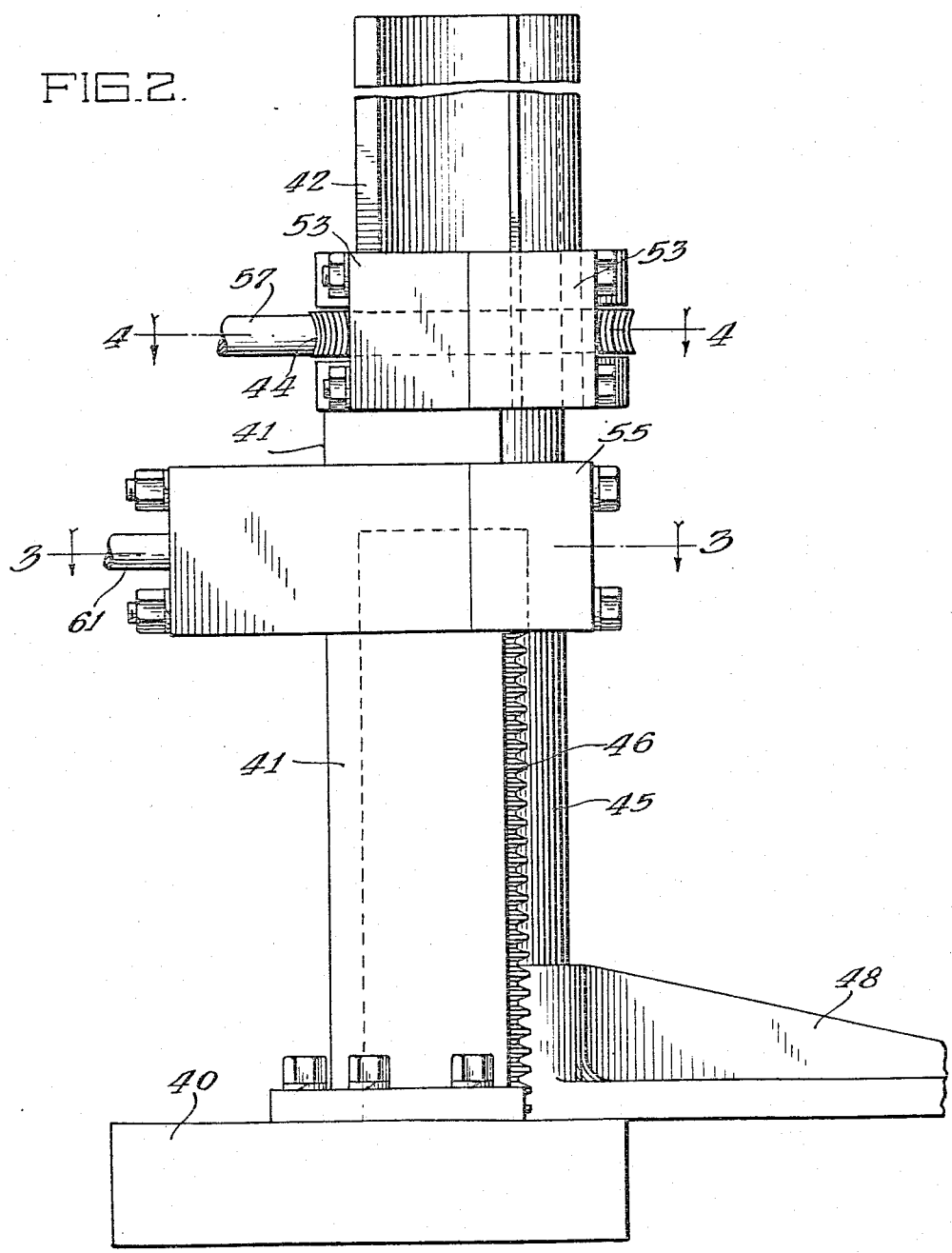
Fig. 2 is an elevational view of the positioning device of Fig. 1.

The auxiliary activating mechanism, as embodied in Fig. 1 of this disclosure, consists of a fixed cylinder 28, a movable piston 29 therein, and a shaft 50 attached to the piston. The shaft 50 is attached to the upper end of the tube 45 which is closed, except for apertures 59 therein. Tube 45 has sliding contact with the exterior of cylinder 28. A passage 51 extends through the base 40 and into the cylinder 28 to permit a gas to be introduced into the cylinder chamber.

In operation, the arm 48 is rotated with respect to the base 40 by rotating the shaft 57, which is drivingly connected with the arm 48 through worm gear 43, worm wheel 44, sleeve 42, rack 46, and tube 45. The tube 45 may be reciprocated without being rotated, because the rack 46 is keyed to the slot 23 in the sleeve 42 above the point where the sleeve 42 is cut away, and it is keyed below that point between the sleeve 42 and the arm 48. The pinion gear 47 is held against vertical movement relative to the support member 41 by virtue of the shaft 61 and the housing 55 and vertically translates the rack 46 and the tube 45 attached thereto, with respect to the base 40. Rotation of the arm 48 is limited by engagement of the pinion gear 47 with the sides of the slot 23 in the sleeve 42 and by engagement of the arm 48 with the support 41. A stop is provided for the translational motion of the arm 48 by contact thereof with the base 40 and with the support member 41 at the point where the support member 41 is cut away, as indicated in Fig. 1.

The auxiliary activating mechanism permits the arm 48 to be rapidly translated by applying compressed air to the compression cylinder 28. This causes the piston 29 to be translated in the cylinder 28. The motion is transmitted to the tube 45 by the shaft 50, and hence to the arm 48. The pinion gear 47 is allowed to turn freely in the rack 46 during this operation by means of a ratchet assembly, not shown, connected between the shaft 61 and the drive mechanism operating that gear, not shown. The apertures 59 serve to prevent the formation of a vacuum in the top end of the tube 45 during this operation.

The positioning device may be used without the auxiliary activating mechanism. The embodiment here described permits translating a load, and rotating said load within the limits of motion determined by the stops provided. The stop provided for rotation by the support member 41 permits rotation through an angle of approximately 70°. The maximum translational motion is, in this particular embodiment, approximately nine inches.

The invention is not limited to the embodiment here disclosed, and it should not be restricted except insofar as set forth in the following claims.

What is claimed is:

1. A positioning device comprising in combination: a support member, a guide member having a slot therethrough supported by the support member and rotatable with respect thereto, means to rotate the guide member mounted upon the support member, a positioning member provided with a protruding key slideably keyed to the slot in the guide member, said positioning member being adapted to position a load, and means mounted upon the support member coupled to the key to adjust the position of the positioning member along the slot.

2. A positioning device comprising in combination: a support member, a guide member having a slot therethrough supported by the support member and rotatable with respect thereto, means to rotate the guide member mounted upon the support member, a positioning member provided with a rack slideably keyed to the slot in the guide member and extending therein and said positioning member being adapted to position a load, and a gear mounted upon the support member engaging the rack to move the positioning member along the slot.

3. A positioning device comprising in combination: a cylindrical support member, a cylindrical guide member rotatably sleeved within the support member and provided with a slot therethrough having sides normal to the plane of rotation of the guide member, means mounted upon the support member to rotate the guide member, a cylindrical positioning member slideably sleeved within the guide member provided with a protruding rack on its outer surface, said rack being slideably keyed to the slot in the guide member and said positioning member being adapted to position a load, and gearing mechanism mounted upon the support member and engaging the rack to move the positioning member along the slot.

4. A positioning device comprising in combination: a cylindrical support member, a cylindrical guide member rotatably sleeved within the support member and having a slot therethrough with sides normal to the plane of rotation of the guide member, means to rotate the guide member mounted upon the support member, a cylindrical positioning member slideably sleeved within the guide member provided with a protruding key on its outer surface, said key being slideably keyed to the slot in the guide member and said positioning member being adapted to position a load, and means mounted upon the support member coupled to the key to adjust the position of the positioning member along the slot.

5. A positioning device comprising in combination: a cylindrical support member, a cylindrical guide member rotatably sleeved within the support member and having a slot therethrough having sides normal to the plane of rotation of the guide member, means to rotate the guide member mounted upon the support member, a cylindrical positioning member slideably sleeved within the guide member provided with a protruding arcuate rack on its outer surface, said rack being slideably keyed to the slot in the guide member and said positioning member being adapted to position a load, and a pinion gear engaging said rack mounted on the support member.

6. A positioning device with an auxiliary activating mechanism comprising in combination: a cylindrical support member, a cylindrical guide member rotatably sleeved within the support member and provided with a slot therethrough having sides normal to the plane of rotation of the guide member, means to rotate the guide member mounted upon the support member, a cylindrical positioning member slideably sleeved within the guide member provided with a protruding arcuate rack on its outer surface, said rack being slideably keyed to the slot in the guide member and said positioning member being adapted to position a load, gearing mechanism mounted upon the support member including a pinion gear engaging the rack to move the positioning member within the slot, a compressing cylinder, a piston slideably mounted within the cylinder, means to apply a fluid pressure to one end of the cylinder, and means to activate the positioning member connected to the piston and the said positioning member.

7. A positioning device with an auxiliary activating mechanism comprising in combination: a cylindrical support member, a cylindrical guide member rotatably sleeved within the support member and having a slot therethrough with sides normal to the plane of rotation of the guide member, means to rotate the guide member mounted upon the support member, a cylindrical positioning member slideably sleeved within the guide member provided with a protruding key on its outer surface, said key being slideably keyed to the slot in the guide member and said positioning member being adapted to position a load, means mounted upon the support member coupled to the key to adjust the position of the positioning member along the slot, a compression cylinder, a piston slideably mounted within the cylinder, means to apply a fluid pressure to one end of the cylinder, and means to activate the positioning member connected to the piston and to the said positioning member.

8. A positioning device with an auxiliary activating mechanism comprising in combination: a cylindrical support member, a cylindrical guide member mounted upon the support member rotatably sleeved within the support member and provided with a slot therethrough having sides normal to the plane of rotation of the guide member, means to rotate the guide member, a cylindrical positioning member slideably sleeved within the guide member provided with a protruding arcuate rack on its outer surface, said rack being slideably keyed to the slot in the guide member and said positioning member being adapted to position a load, a pinion gear engaging said rack mounted on the support member, a compression cylinder, a piston slideably mounted within the cylinder, means to apply a fluid pressure to one end of the cylinder, and means to activate the positioning member connected to the piston and to the said positioning member.

9. A positioning device with an auxiliary activating mechanism adapted to remotely engage a load comprising in combination: a cylindrical support member, a cylindrical guide member rotatably sleeved within the support member and having a slot therethrough having sides normal to the plane of rotation of the guide member, means to rotate the guide member, a cylindrical positioning member mounted upon the support member slideably sleeved within the guide member provided with a protruding rack on its outer surface, said rack being slideably keyed to the slot in the guide member, a pinion gear engaging said rack mounted on the support member, an arm attached to the positioning member provided with a socket adapted to cooperate with a plug on the load upon rotation of said arm, a compression cylinder, a piston slideably mounted within the cylinder, means to apply a fluid pressure to one end of the cylnder, and means to activate the positioning member connected to the piston and the said positioning member.

10. A positioning device with an auxiliary activating mechanism adapted to remotely engage a load comprising in combination: a cylindrical support member, a cylindrical guide member rotatably sleeved within the support member and having a slot therethrough having sides normal to the plane of rotation of the guide member, means to rotate the guide member mounted upon the support member, a cylindrical positioning member slideably sleeved within the guide member provided with a protruding arcuate rack on its outer surface, said rack being slideably keyed to the slot in the guide member, gearing mechanism mounted upon the support member engaging the rack to move the positioning member along the slot, an arm attached to the positioning member provided with a socket adapted to cooperate with a plug on the load upon rotation of said arm, a compression cylinder slideably sleeved within the positioning member and attached to the support member, a piston slideably mounted within the cylinder, means to apply a fluid pressure to one side of the piston, and a rod connecting the piston to the positioning member.

11. A positioning device comprising in combination: a cylindrical support member, a cylindrical guide member rotatably sleeved within the support member and having an aperture therethrough, said aperture having sides normal to the plane of rotation of the guide member, means to rotate the guide member mounted upon the support member, a cylindrical positioning member sleeved within the guide member and slideable therewith, an arced rack longitudinally attached to the outer surface of the positioning member having a radius of curvature similar to that of said surface and mounted within the aperture, an arm attached to the positioning member abutting the rack and mounted within the aperture, and said arm being adapted to position a load, and a pinion gear mounted on the support member and engaged with the rack.

12. A positioning device with an auxiliary activating mechanism comprising in combination: a cylindrical support member, a cylindrical guide member rotatably sleeved within the support member and having an aperture therethrough, said aperture having sides normal to the plane of rotation of the guide member, means to rotate the guide member mounted upon the support member, a cylindrical positioning member sleeved within the guide member and slideable therewith, an arced rack longitudinally attached to the outer surface of the positioning member having a radius of curvature similar to that of said surface and mounted within the aperture, an arm attached to the positioning member abutting the rack and mounted within the aperture, said arm being adapted to position a load, a pinion gear mounted on the support member and engaged with the rack, a compression cylinder, a piston slideably mounted within the cylinder, means to apply a fluid pressure to one end of the cylinder, and means to activate the positioning member connected to the piston and said positioning member.

13. A positioning device comprising in combination: three concentric cylinders slideably mounted one within the other, means to rotate the first of these cylinders mounted upon the second of these cylinders, a longitudinal slot in the surface of the rotatable cylinder adjacent to the third of these cylinders, a key attached to the third cylinder slideable within the slot, and means mounted upon the second of the cylinders to translate the third cylinder.

References Cited in the file of this patent

UNITED STATES PATENTS

| | | |
|---|---|---|
| 81,919 | Mason | Sept. 8, 1868 |
| 279,868 | Hall | June 19, 1883 |
| 1,613,992 | Glasgow | Jan. 11, 1927 |
| 2,395,411 | Kittel | Feb. 26, 1946 |